United States Patent
Yu et al.

(10) Patent No.: US 11,336,611 B2
(45) Date of Patent: *May 17, 2022

(54) ELECTRONIC DEVICE, SERVER, AND CONTROL METHOD AND LOCATION INFORMATION PROVIDING METHOD FOR THE ELECTRONIC DEVICE

(71) Applicant: THINKWARE CORPORATION, Seongnam-si (KR)

(72) Inventors: Hyun Joong Yu, Seongnam-si (KR); Jun Sik Kim, Seongnam-si (KR); Won Jun Heo, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/060,839

(22) Filed: Oct. 1, 2020

(65) Prior Publication Data
US 2021/0029070 A1    Jan. 28, 2021

Related U.S. Application Data

(63) Continuation of application No. 16/274,400, filed on Feb. 13, 2019, now Pat. No. 10,812,440, which is a
(Continued)

(30) Foreign Application Priority Data

May 21, 2013   (KR) .................. 10-2013-0057416

(51) Int. Cl.
| H04L 12/58 | (2006.01) |
| H04L 51/52 | (2022.01) |
| H04L 51/222 | (2022.01) |

(52) U.S. Cl.
CPC .............. H04L 51/32 (2013.01); H04L 51/20 (2013.01)

(58) Field of Classification Search
CPC ................................ H04L 51/32; H04L 51/20
See application file for complete search history.

(56) References Cited

U.S. PATENT DOCUMENTS 6,810,328 B2    10/2004  Yokota et al.
7,660,872 B2    2/2010   Delia et al.
(Continued)

FOREIGN PATENT DOCUMENTS

| CN | 102288189 B | 5/2017 |
| JP | 1994-036194 A | 2/1994 |

(Continued)

OTHER PUBLICATIONS

Non-Final Office Action dated Jul. 1, 2021, issued in U.S. Appl. No. 17/035,079. (15 pages).
(Continued)

*Primary Examiner* — Christopher B Robinson
(74) *Attorney, Agent, or Firm* — Westerman, Hattori, Daniels & Adrian, LLP

(57) ABSTRACT

A first electronic device of the present invention comprises at least one communication circuitry, at least one display, at least one memory configured to store instructions, and at least one processor operatively coupled with the at least one communication circuitry and the at least one display. The processor is configured to (1) access to a first server for a navigation service through an application for the navigation service linked with a first account for accessing to a second server, (2) receive a user input through the application, (3) transmit, via the first server to a second electronic device of a second user that is authenticated through the application linked with a second account for accessing to the second
(Continued)

server, a message, (4) periodically transmit, via the first server to the second electronic device, information, and (5) display a positional relationship between the two electronic devices over an electronic map.

20 Claims, 12 Drawing Sheets

Related U.S. Application Data continuation of application No. 14/283,579, filed on May 21, 2014, now Pat. No. 10,243,909.

(56) References Cited

U.S. PATENT DOCUMENTS

| | | | |
|---|---|---|---|
| 8,971,924 | B2 | 3/2015 | Pai et al. |
| 8,977,488 | B2 | 3/2015 | Pierfelice |
| 8,989,773 | B2 | 3/2015 | Sandel et al. |
| 9,076,349 | B2 | 7/2015 | Gupta |
| 9,264,849 | B1 | 2/2016 | Kahn et al. |
| 2002/0080198 | A1 | 6/2002 | Giraldin et al. |
| 2003/0100326 | A1 | 5/2003 | Grube et al. |
| 2005/0184875 | A1 | 8/2005 | Schmandt et al. |
| 2006/0155461 | A1 | 7/2006 | Cho |
| 2006/0259765 | A1 | 11/2006 | Song et al. |
| 2007/0233635 | A1 | 10/2007 | Burfeind et al. |
| 2007/0281716 | A1 | 12/2007 | Altman et al. |
| 2009/0109174 | A1 | 4/2009 | Fein et al. |
| 2010/0332326 | A1 | 12/2010 | Ishai |
| 2011/0069016 | A1* | 3/2011 | Victor .......... G06F 3/0486 345/173 |
| 2011/0153189 | A1 | 6/2011 | Chiang et al. |
| 2011/0224896 | A1 | 9/2011 | Napieraj |
| 2012/0084348 | A1 | 4/2012 | Lee et al. |
| 2012/0095681 | A1 | 4/2012 | An et al. |
| 2012/0221247 | A1* | 8/2012 | Aben .......... G09B 29/10 701/537 |
| 2012/0239584 | A1 | 9/2012 | Yariv et al. |
| 2012/0259541 | A1* | 10/2012 | Downey .......... G01C 21/20 701/433 |
| 2012/0302258 | A1 | 11/2012 | Pai et al. |
| 2012/0303484 | A1 | 11/2012 | Kim et al. |
| 2013/0103313 | A1 | 4/2013 | Moore et al. |
| 2013/0111370 | A1* | 5/2013 | Pasquero .......... G06F 3/0481 715/761 |
| 2013/0226453 | A1 | 8/2013 | Trussel et al. |
| 2013/0282494 | A1 | 10/2013 | Newlands et al. |
| 2013/0303190 | A1 | 11/2013 | Khan et al. |
| 2013/0332067 | A1 | 12/2013 | Schlesinger et al. |
| 2014/0062790 | A1 | 3/2014 | Letz et al. |
| 2014/0213295 | A1 | 7/2014 | Conklin |
| 2014/0222912 | A1 | 8/2014 | St. Clair |

FOREIGN PATENT DOCUMENTS

| | | | |
|---|---|---|---|
| JP | 2001-317953 A | 11/2001 | |
| JP | 2002-262338 A | 9/2002 | |
| JP | 2003-141682 A | 5/2003 | |
| JP | 3511780 B2 | 3/2004 | |
| JP | 2004-317275 A | 11/2004 | |
| JP | 2005-147858 A | 6/2005 | |
| JP | 2005147858 A | 6/2005 | |
| JP | 2005-196243 A | 7/2005 | |
| JP | 3841776 B2 | 11/2006 | |
| JP | 3979060 B2 | 9/2007 | |
| JP | 4564480 B2 | 10/2010 | |
| JP | 5151602 B2 | 2/2013 | |
| KR | 10-1999-0010257 A | 2/1999 | |
| KR | 10-1999-0068754 A | 9/1999 | |
| KR | 10-2000-0050147 A | 8/2000 | |
| KR | 10-2001-0035405 A | 5/2001 | |
| KR | 10-2002-0051791 A | 6/2002 | |
| KR | 10-2003-0044507 A | 6/2003 | |
| KR | 10-2005-0022995 A | 3/2005 | |
| KR | 10-0547371 B1 | 1/2006 | |
| KR | 10-2006-0011045 A | 2/2006 | |
| KR | 10-0556689 B1 | 3/2006 | |
| KR | 10-2006-0083748 A | 7/2006 | |
| KR | 10-0687413 B1 | 2/2007 | |
| KR | 10-0786024 B1 | 12/2007 | |
| KR | 10-2010-0068606 A | 6/2010 | |
| KR | 10-2011-0055267 A | 5/2011 | |
| KR | 20120061206 A | 6/2012 | |
| KR | 10-2012-0108107 A | 10/2012 | |
| KR | 10-2013-0025047 A | 3/2013 | |
| KR | 101405945 B1 | 6/2014 | |
| KR | 101677618 B1 | 11/2016 | |
| WO | 2010093481 A3 | 10/2010 | |

OTHER PUBLICATIONS

Non-Final Office Action dated Jul. 16, 2021, issued in U.S. Appl. No. 17/016,818. (41 pages).

Non-Final Office Action dated Jul. 15, 2021, issued in U.S. Appl. No. 17/016,792. (27 pages).

Non-Final Office Action dated Oct. 8, 2021, issued in U.S. Appl. No. 17/060,848 (36 pages).

"Get to Know Waze", <https://www.youtube.com/watch?v=y_7yoEUrVhw>, Mar. 5, 2013.

"Get to Know Waze", <https://www.youtube.com/watch?v=y3s_S5Mn5VQ>, Oct. 31, 2012.

"Get to Know Waze", <https://www.youtube.com/watch?v=hGDrzDw2a7s>, Apr. 27, 2011.

"Replacing iOS 6 Maps: Hands-on with MapQuest, Bing, Waze, Google, Nokia", <https://arstechnica.com/gadgets/2012/10/replacing-ios-6-maps-hands-on-with-mapquest-bing-waze-google-nokia/>, Mar. 11, 2012.

Final Office Action dated Mar. 7, 2022, issued in U.S. Appl. No. 17/035,079. (16 pages).

Non-final Office Action dated Mar. 29, 2022, issued in U.S. Appl. No. 17/060,848. (21 pages).

* cited by examiner

ELECTRONIC DEVICE, SERVER, AND CONTROL METHOD AND LOCATION INFORMATION PROVIDING METHOD FOR THE ELECTRONIC DEVICE

CROSS-REFERENCE TO RELATED APPLICATIONS

This application is a continuation of U.S. application Ser. No. 16/274,400 filed on Feb. 13, 2019, which is a continuation of U.S. application Ser. No. 14/283,579 filed on May 21, 2014, which claims priority to Korean Patent Application No. 10-2013-0057416 filed on May 21, 2013, the entire disclosures of which are hereby incorporated by reference.

BACKGROUND OF THE INVENTION

1. Technical Field

The present invention relates to an electronic device for providing location information of group members, a method for controlling the electronic device, a server for providing the location information, and a method for providing the location information through the server.

2. Description of the Related Art

Internet networks become open and laws related to location data have been modified. Therefore, LBS (Location Based Service)-related industries are being activated. A representative device using such a location based service is a navigation device for a vehicle for determining a current position of a vehicle, etc. or providing navigation services for guiding a moving route into a destination.

In recent, a mobile terminal provides information related to the current position of a determined user or navigation services for guiding the moving route, using applications providing the location based services by mounting various multimedia functions.

However, a prior mobile terminal provides services related to the location information for the use of one person or the moving route, but does not provide services related to the location information for the group members or the moving route synthetically on interworking with built social network services and forming groups.

SUMMARY OF THE INVENTION

According to an aspect of the invention, there is provided an electronic device including: a communication unit for communicating with a social network service providing server and location information service providing server; and a controller for periodically transmitting current location information to the location information service providing server through the communication unit in case of executing grouping application, producing group including at least member, selected by a user, of address list information received from the location information service providing server, for requesting messages requesting group participation to the member included in the group through the social network service providing server in case of generating predetermined events, periodically receiving the location information from the members accepting the group participation and displaying the received location information on a map.

The controller sets a joint destination of the group, and displays starting location information and real time location information of member, included in the groups, for the joint destination into an indicator on a first interface having bar-type.

The controller selects at least two of the members included in the groups and sets a passage destination to them, and displays starting location information and real time location information of the members sharing the passage destination for the passage destination into an indicator on a second interface having bar-type.

The controller converts into a screen providing a route from a current location to the joint destination on requesting route search for the joint destination of the group, and again converts into the screen displaying information for the group on receiving a specific input.

The controller sets limiting time receiving the location information of the member included in the group, in real time updates the location information of the member included in the group during the limiting time, and displays the updated location information on the map.

The controller ends location information providing of the member included in the group and stores group information including member information and name of the group, after lapse of the limiting time.

The controller re-transmits the messages requesting the group participation to the members included in the group through the social network service providing server on re-setting the joint destination and limiting time, together with generation of the predetermined events, using the stored group information.

At this time, the predetermined events include at least one of selection of the user or advent of setting time.

The controller provides detail information including at least one of time accessed finally to the location information service providing server, average speed per hour, and final location information for the member included in the group in case of receiving the specific input.

On receiving the specific input and adding or deleting the member included in the group after producing the group, the controller in real time displays the location information of the members accepting group participation request of the added member on the map and deletes the location information of the deleted member on the map.

On producing a plurality of groups, the controller produces each widget displaying schematic information of the groups including name, personnel of the members, and the limiting time of the groups and therefore displays the produced widget on one screen.

According to another aspect of the invention, there is provided a location information service providing server including a communication unit for communicating with at least one electronic device and a social network service providing server; and a controller producing address list information for location information services using address list information for at least one electronic device received from the social network service providing server in case of receiving requests of location information services interworked with social network services from a first electronic device through the communication unit and transmitting the produced address list information to the first electronic device, requesting group participation and location information to a second electronic device through the social network service providing server in case of receiving the requests of group production including at least one member, selected by a user, of the transmitted address list information and the location information of the second electronic device corresponding to member included in the group from the first electronic device, and transmitting the location information of the second electronic device to the first electronic device in case of receiving the location information from the second electronic device.

The controller provides a widget displaying detail information of the group including name, personnel of the member, and limiting time of the group to the first electronic device, and controls to change and display the limiting time of the widget after lapse of time.

The controller matches information for the group with information of the first electronic device and manages the matched information.

The controller provides an interface, having a bar-type, displaying real time location information of the second electronic device and starting location and real time location information of the second electronic device for the joint destination of the group into an indicator to the first electronic device during the limiting time.

According to further another aspect of the invention, there is provided a method for controlling an electronic device including executing grouping applications; producing group including at least one member, selected by a user, of address list information received from an location information service providing server; transmitting messages requesting group participation to member included in the group through the social network service providing server in case of generating predetermined events after producing the group; periodically receiving the location information from member accepting the group participation and displaying the received location information on a map.

A step receiving the location information from the member accepting the group participation and displaying the received location information on the map periodically receives the location information of the member included in the group from the location information service providing server, and displays the received location information on the map.

The method for controlling the electronic device further includes setting the joint destination and limiting time of the produced group between the step producing the group and the step transmitting the messages requesting the group participation to the member included in the group.

A step periodically receiving the location information from the member accepting the group participation and displaying the received location information on the map displays the location information of the member included in the group on the map, and simultaneously displays starting location information and real time location information of the member included in the group for the joint destination into an indicator on an interface having bar-type.

The method for controlling the electronic device further includes selecting at least two of the member of the group and setting a passage destination between the step transmitting the messages requesting the group participation to the member included in the group and the step periodically receiving the location information from the member accepting the group participation and displaying the received location information on the map.

A step periodically receiving the location information from the member accepting the group participation and displaying the received location information on the map displays the location information of the member included in the group on the map, and simultaneously displays starting location information and real time location information of the member included in the group for the joint destination into the indicator on an first interface having bar-type, and displays starting location information and real time location information of the member passing the passage destination for the passage destination on a second interface having bar-type.

Further, according to further another aspect of the invention, there is provided a method for providing location information services including receiving requests of location information services interworked with social network services from a first electronic device; connecting to social network service providing servers on receiving the requests of the location information services and receiving the stored address list information, and producing address list information for the location information services using the received address list information; transmitting the produced list information to the first electronic device and receiving the requests of group production including at least one member, selected by a user, of the transmitted address list information and the location information of the second electronic device corresponding to the member included in the group from a first electronic device; transmitting the messages requesting group participation and the location information of the second electronic device through the social network service providing servers; and receiving the location information from the second electronic device and transmitting the received location information to the first electronic device.

A method for controlling the electronic device and a method for providing the location information service in the present invention described above are recorded into a computer-readable recording medium by programs for executing in a computer.

The specifics of other embodiments are included in the detailed description and drawings.

DESCRIPTION OF THE PREFERRED EMBODIMENTS

Figure 1:
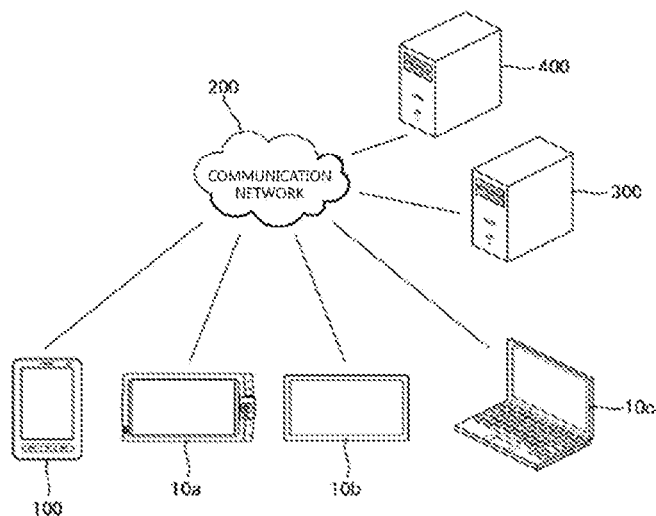
FIG. 1 shows schematic configurations of system environment related to one embodiment of the present invention.

Various features and advantages of the present invention will be more obvious from the following description with reference to the accompanying drawings. Hereinafter, embodiments of the invention will be described with reference to the attached drawings. Like reference numerals denote like elements throughout the specification. In describing exemplary embodiments of the present invention, well-known functions or constructions will not be described in detail since they may unnecessarily obscure the understanding of the present invention.

Hereinafter, a mobile terminal related to the present invention will be described in more detail with reference to drawings. Suffix "module" and "unit" for the configurations used in the following description are given or mixed for the easiness of specification writing, and they have no meanings or roles distinguished from each other.

The electronic device described in the present specification includes a mobile phone, a smart phone, a laptop computer, a terminal for digital broadcasting, PDA (Personal Digital Assistants), PMP (Portable Multimedia Player), a navigation device, etc.

Hereinafter, exemplary embodiments of the present invention will be described in detail with reference to the accompanying drawings.

FIG. 1 shows schematic configurations of system environment related to one embodiment of the present invention.

Referring to FIG. 1, the system environment related to one embodiment of the present invention includes a plurality of electronic devices 100, 10a, 10b, 10c, a communication network 200 and a server 300, 400.

The plurality of electronic devices 100, 10a, 10b, 10c may be fixing terminals or mobile terminals. The plurality of electronic devices 100, 10a, 10b, 10c are, for example, a navigation device, a smart phone, a mobile phone, a computer, a laptop computer, a terminal for digital broadcasting, a PDA (Personal Digital Assistants), a PMP (Portable Multimedia Player), a MID (Mobile Internet Device), a tablet PC, etc.

Hereinafter, the plurality of electronic devices 100, 10a, 10b, 10c refer to a first electronic device 100, a second electronic device 10a, a third electronic device 10b and a fourth electronic device 10c. It is assumed that the first electronic device 100, second electronic device 10a, third electronic device 10b and fourth electronic device 10c in the present application become mobile terminals, particularly smart phones to describe various embodiments.

Each electronic device 100, 10a, 10b, 10c may communicate with another electronic devices by a wireless or wired communication scheme. The plurality of electronic devices 100, 10a, 10b, 10c in the present application may be communicated from each other. A technical idea in the present application may be applied to the entire wireless communication scheme between the existing electronic devices and the entire communication scheme of tomorrow.

For example, the plurality of electronic devices 100, 10a, 10b, 10c may be communicated from each other by communication schemes such as UPnP (Universal Plug and Play), WiFi, etc. In addition, for example, the plurality of electronic devices 100, 10a, 10b, 10c may be communicated from each other via the communication network 200 or by a local communication scheme. Examples for the communication network 200 are a mobile communication network, a wired internet, a wireless internet, a broadcasting network, etc.

Further, each of electronic devices 100, 10a, 10b, 10c may configure networks together with another electronic devices, and the plurality of electronic devices 100, 10a, 10b, 10c included in the networks may share contents.

The first electronic device 100 may configure the networks together with another electronic devices 10a, 10b, 10c or servers 300, 400 through communication links between the electronic devices, and may share the contents together with another electronic devices 10a, 10b, 10c included in the networks. The contents are Instant Message (IM), location information, etc.

The networks are formed by social relation structures formed by co-dependent ties between each of the nodes on websites. The nodes included in social networks represent individual subjects in the networks.

It is assumed that each node 100, 10a, 10b, 10c configuring the networks in the present application become the electronic devices to describe various embodiments. However, it is also possible to apply the technical idea in the present application to entities having different nodes configuring the networks.

For example, the nodes configuring the networks may be users, buildings, roads, locations, servers, etc. That is, the first electronic device 100 may configure social networks together with at least one user, buildings, roads, locations, servers, etc. The first electronic device 100 may become accounts produced in response to each of the roads, buildings, locations, etc. in the case that the nodes included in the social networks are the roads, buildings, locations, etc.

The servers 300, 400 may be communicated with the plurality of electronic devices 100, 10a, 10b, 10c through the communication networks 200, and may acquire various contents by communicating with the plurality of electronic devices 100, 10a, 10b, 10c. The servers 300, 400 may transmit various contents to the plurality of electronic devices 100, 10a, 10b, 10c by communicating with the plurality of electronic devices 100, 10a, 10b, 10c. The servers 300, 400 may support the network 200 configured with the plurality of electronic devices 100, 10a, 10b, 10c.

Hereinafter, it is assumed that one server 300 is a social network service providing server 300 for providing instant messaging services between the plurality of electronic devices 100, 10a, 10b, 10c, and another server 400 is a location information service providing server 400 for providing location information services of group members. The location information service providing server 400 may use address list information stored into the social network service providing server 300 while interworking with the social network service providing server 300, and may transfer messages between the plurality of electronic devices 100, 10a, 10b, 10c through the social network service providing server 300.

Hereinafter, the electronic device 100 is described in more detail with reference to the drawings.

Figure 2:
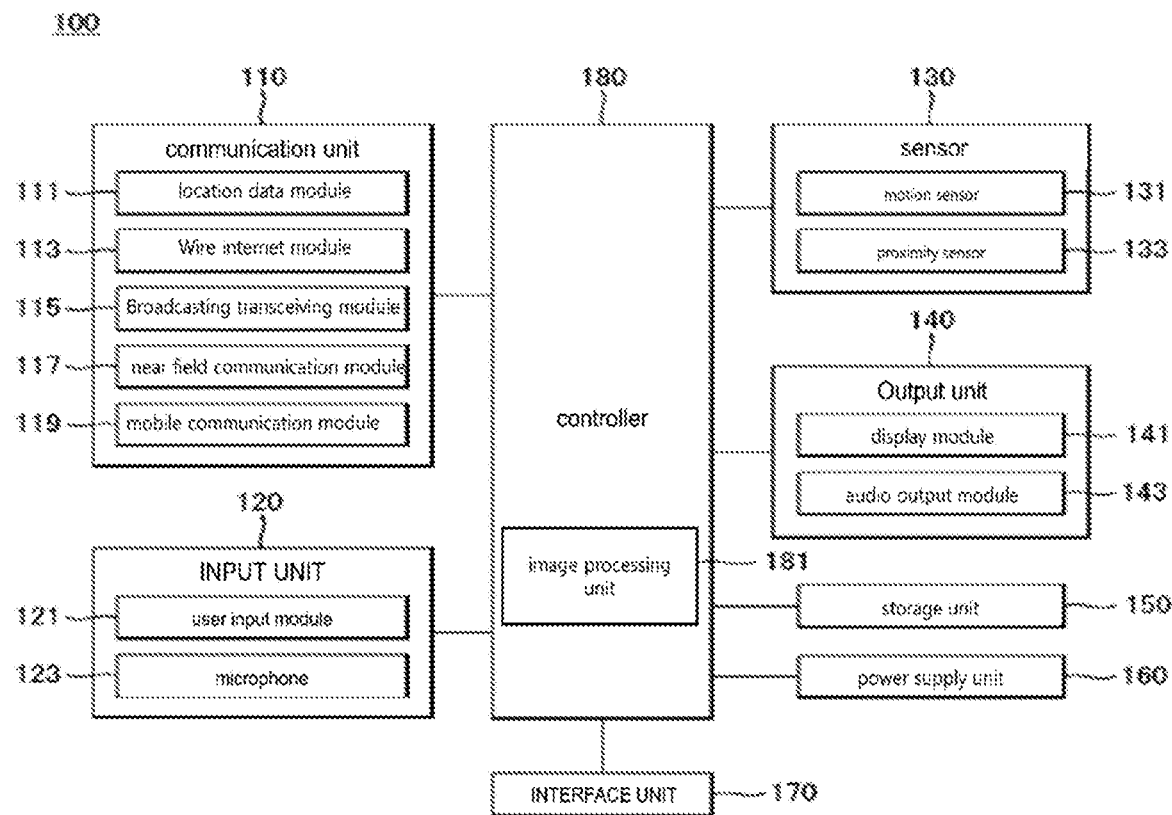
FIG. 2 shows block configurations of electronic device related to one embodiment of the present invention.

FIG. 2 shows block configurations of electronic device related to one embodiment of the present invention.

It is assumed in the present application that, as shown in FIG. 1, the electronic device 100 is the mobile terminal, particularly the smart phone to describe various embodiments. However, it is possible to apply the technical idea disclosed in the present application to various electronic devices such as the navigation device, tablet PC, laptop computer, etc.

Referring to FIG. 2, the mobile terminal 100 includes a communication unit 110, an input unit 120, a sensor 130, an output unit 150, a storage unit 150, a power supply unit 160 and a controller 170. The configurations shown in FIG. 2 are not necessary, and therefore the mobile terminal 100 may have configurations more or less than the configurations shown in FIG. 1.

Hereinafter, the configurations are described in turn.

The communication unit 110 include at least one module that makes communication between the mobile terminal 100 and the communication networks or networks having the mobile terminal 100 different from the mobile terminal 100 or the electronic devices 10a, 10b, 10c different from the mobile terminal 100 possible.

For example, the communication unit 110 includes a location data module 111, a wireless internet module 113, a broadcasting transceiving module 115, a near field communication module 117, a mobile communication module 119, etc.

The location data module 111 acquires location data of the mobile terminal 100. The location data module 111 use the method acquiring the location data through GNSS (Global Navigation Satellite System) as the method for acquiring the location data.

The GNSS is the navigation system capable of calculating the location of reception terminals using radio signals received from satellites. Concrete examples for the GNSS may be GPS (Global Locationing System), Galileo, GLO-NASS (Global Orbiting Navigational Satellite System), COMPASS, IRNSS (Indian Regional Navigational Satellite System), QZSS (Quasi-Zenith Satellite System), etc. according to operators thereof.

The present application describes various embodiments, for example, in the case that the GNSS is the GPS. The location data module 111 uses GPS signals from artificial satellites to acquire the location data in the case that the GNSS is the GPS.

The wireless internet module 113 is connected to the wireless internet and therefore acquires or transmits data. The wireless internet capable of connecting through the wireless internet module 113 may be WLAN (Wireless LAN), Wibro (Wireless broadband), Wimax (World interoperability for microwave access), HSDPA (High Speed Downlink Packet Access), etc.

The broadcasting transceiving module 115 receives the broadcasting signals through various broadcasting systems. The broadcasting systems capable of receiving through the broadcasting transceiving module 115 may be DMBT (Digital Multimedia Broadcasting Terrestrial), DMBS (Digital Multimedia Broadcasting Satellite), MediaFLO (Media Forward Link Only), DVBH (Digital Video Broadcast Handheld), ISDBT (Integrated Services Digital Broadcast Terrestrial), etc. The broadcasting signals received through the broadcasting transceiving module 115 may be included with traffic data, life data, etc.

The near field communication module 117 is a module for the local communication. Bluetooth, RFID (Radio Frequency Identification), IrDA (Infrared Data Association), UWB (Ultra Wideband), ZigBee, etc. may be used as the local communication technologies.

The mobile communication module 119 transmits/receives wireless signals from/in at least one of base stations, an exterior terminal and servers on the mobile communication networks. The wireless signals may include voice call signals, video communication call signals or data having various types according to transmission/receipt of characters/multimedia messages.

The input unit 120, which is a module for generating input data for operation control of the mobile terminal 100, converts physical inputs from the outside into specific electrical signals to generate input data. The input unit 120 includes a user input module 121, a microphone 123, a camera 125, etc.

The user input module 121 receives control inputs for operation control of the mobile terminal 100 from the user. The user input module may be configured with a key pad, a dome switch, a touch pad (static pressure type/electrostatic type), a jog wheel, a jog switch, etc. For example, the user input module 121 may be implemented with navigation operation keys disposed in a body of the mobile terminal 100.

The microphone 123 receives audio signals generated from the user's voice and the inside and outside of vehicles. The microphone 123 may be implemented with a microphone 195 disposed in the body of the mobile terminal 100.

The camera 125 captures images inside and outside the vehicles. For example, the camera 125 may capture traveling images of the vehicles The sensor 130 senses current states of the mobile terminal 100 and therefore generates sense signals for controlling operations of the mobile terminal 100. The sensor 140 senses a current state of the mobile terminal 100 such as an opening and closing state of the mobile terminal 100, a location of the mobile terminal 100, a user touch or not, an azimuth of the mobile terminal, and acceleration/reduction of speed of the mobile terminal and therefore generates sense signals for controlling operations of the mobile terminal 100. For example, when the mobile terminal 100 is a slide phone type, it senses an opening/closing or not of the slide phone. In addition, it may be in charge of sense functions related to power supply or not of the power supply unit 160 and an exterior device coupling or not of the interface unit 170, etc. On the other hand, the sense unit 130 includes a motion sensor 131 and/or a proximity sensor 133.

The motion sensor 131 may sense motions of the mobile terminal 100 at a three dimensional space, and may be used to acquire the user holding the mobile terminal 100 or the motions of the vehicles mounted with the mobile terminal 100 and impact amount from the outside based on the motions of the mobile terminal 100 at the three dimensional space. The pose sense sensor 131 may include a gyroscope, an accelerometer, a magnetic sensor, a gravity sensor, etc. Motion data acquired by the pose sense sensor 131 are combined with location data acquired by the location data module 111, thereby to calculate more accurate trajectories for the user or vehicles holding the mobile terminal 100.

The proximity sensor 133 senses the access of external things into the mobile terminal 100. The brightness of a display module 141 may be changed in correspondence with the surroundings brightness using data acquired by the proximity sensor 133. The proximity sensor 133 detects whether objects approaching certain detecting faces or the objects that exist near it are present or not using the power of electric and magnetic fields or infrared rays without mechanical touches. The proximity sensor 133 has a long life and high availability as compared with a touch sensor. Examples for the proximity sensor 133 are a transparent photoelectricity sensor, a direct reflective photoelectricity sensor, a mirror-reflective photoelectricity sensor, a high-frequency oscillation-type proximity sensor, a capacitive proximity sensor, a magnetic proximity sensor and an infrared proximity sensor, etc.

The mobile terminal 100 outputs data at the output unit 140. The output unit 140 includes the display module 141 and an audio output module 143, etc.

The display module 141 displays information processed by the mobile terminal 100. For example, the display module 141 may display UI (User Interface) or GUI (Graphic User Interface) related to the location information services.

The display module 141 may include at least one of liquid crystal display, thin film transistor-liquid crystal display), organic light-emitting diode, flexible display and 3D display.

When the display module 141 and the sensor (hereinafter, called "touch sensor") for sensing touch operations form mutual layer structures (hereinafter, abbreviated as "touch screen"), the display module 141 may be used as input devices besides the output devices. The touch sensor may have types such as, for example, touch films, touch sheets, touch pads.

The touch sensor converts changes for pressures applied or capacitance generated to the specific parts of the display module 141 into electrical input signals. The touch sensor may detect locations and areas to be touched and the pressures to be touched.

When there are touch inputs for the touch sensors, signals corresponding to the touch inputs are sent to a touch controller. The touch controller processes the signals and then transmits data corresponding to the processed signals to the controller 180. Therefore, the controller 180 may know whether which regions of the display module 141 are touched.

The proximity sensor 133 may be disposed inside the mobile terminal 100 enclosed by touch screen or near the touch screen. The touch screen detects approach of the pointer by changes of an electric field according to the approach of the pointer in case of a capacitive type. In this case, the touch screen (touch sensor) may be sorted into the proximity sensor 133.

An audio output module 143 outputs audio data capable of recognizing acoustically. The audio output module 143 outputs the audio signals related to the functions (for example, a route guide function) performed at the mobile terminals 100. Such an acoustic output module 143 may be included with a receiver, a speaker, a buzzer, etc.

The storage unit 150 may store programs for operating the mobile terminals 100, and may temporally store data (route information, images) to be input/output in relation with the mobile terminals 100.

The storage unit 150 is built inside the mobile terminals 100 or is detachable and may include at least one storage medium type of a flash memory type, a hard disk type, a multimedia card micro type, a card type of memory (for example, SD or XD memory, etc.), a RAM (Random Access Memory), a SRAM (Static Random Access Memory), a ROM (Read-Only Memory), a EEPROM (Electrically Erasable Programmable Read-Only Memory), a PROM (Programmable Read-Only Memory) magnetic memory, a magnetic disk and a photo disk. The mobile terminal 100 may operate in relation with web storages for performing storage functions of the storage unit 150 on an internet.

The power supply unit 160 receives external and internal electrical power and supplies power required for operating each configuration of the mobile terminal 100 or another devices connected to the mobile terminal 100.

The controller 180 typically controls the whole operations of the mobile terminal 100. Further, the controller 180 may output control signals for controlling another devices connected to the mobile terminal 100.

Hereinafter, a method for controlling the electronic device (particularly, mobile terminal) will be described in more detail with reference to the drawings.

Figure 3:
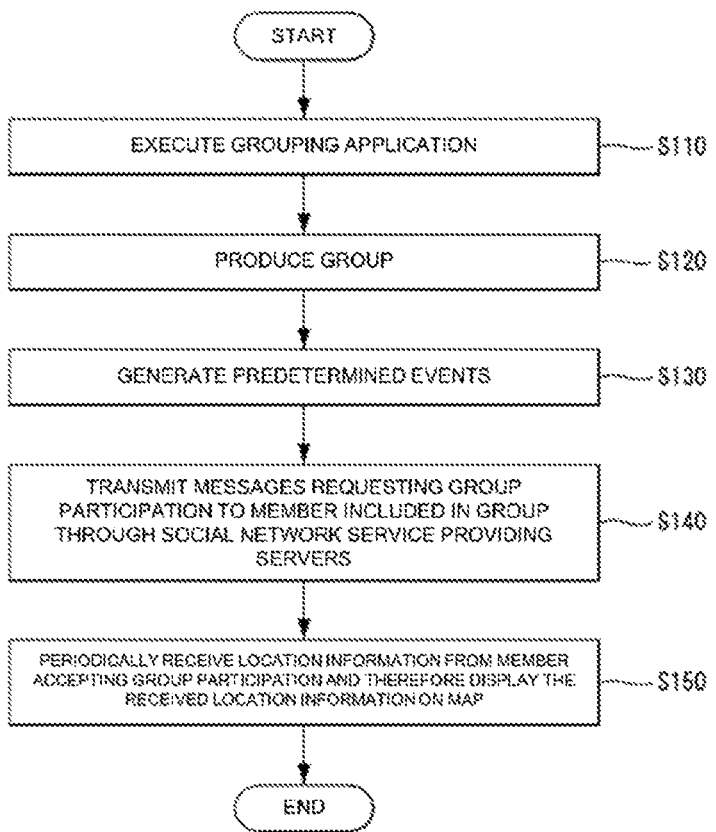
FIG. 3 is a flow chart for a control method of the electronic device related to one embodiment of the present invention.

FIG. 3 is a flow chart for a control method of the electronic device related to one embodiment of the present invention.

Referring to FIG. 3, the controller 180 of the electronic device 100 may execute applications capable of implementing the embodiment of the present invention (S110). Grouping applications, for example, are described as the applications capable of implementing the embodiment of the present invention.

Grouping applications are applications for interworking with social network services, producing the groups using the social network services and providing the location information service of the group members. Hereinafter, the services provided from the grouping applications are called the location information services. The user should log in using social network service accounts so as to use the location information services. That is, after the user executes the grouping applications in specific electronic device 100, the user logs into the location information services using the social network service accounts and may perform user authentication. The social network services according to the embodiment of the present invention may perform real time chatting through a wired/wireless communication network such as kakaotalk, line, tictoc, etc., and is one of the instant messaging service capable of performing the group chatting.

The controller 180 may produce the groups to provide the location information services. The controller 180 may produce the groups including at least one member using address list information received from the location information service providing server 400. At this time, the address list information received from the location information service providing server 400 means user's address list information that uses the location information service of the address list information stored into the social network service providing server 300.

When predetermined events are generated after producing the groups (S130), the controller 180 may transmit messages requesting group participation to the members included in the groups through the social network service providing servers (S140). The predetermined events may be one of the selection of the user or the advent of setting time for specific icons.

The controller 180 includes at least one member according to the selection of the user, sets the joint destination, and may set the names of the groups, the icons of the groups, limiting time, the passage destination, etc. At this time, the limiting time means valid time providing the location information services for the set groups, and the passage destination may be set for some of the group members. The controller 180 produces and displays widgets representing brief information for the groups including at least one of the names of the groups, the icons of the groups, personnel of the group members and the limiting time on producing the groups. The controller 180 changes and displays the limiting time of the widget as time passes. As the limiting time passes, the controller 180 performs the displaying informing the produced group icons of the lapse of the limiting time.

The controller 180 converts into screens providing routes from current locations to joint destinations for the electronic device 100 to which the user belongs and therefore displays the routes, on requesting route search for the joint destinations after setting the groups. Further, the controller 180 may again convert route display screens into the screens for displaying the location information services for the groups on receiving specific inputs requesting the location information service providing of the groups. At this time, the specific inputs may be touch inputs for the specific icons.

The controller 180 periodically receives the location information from the members accepting the group participation and therefore displays the received location information on a map (S150). The controller 180 may display the location information of the group members for the joint destinations of the set groups into an indicator on a first interface having bar-type. Further, the controller 180 may display the location information of the members sharing the passage destination for the passage destination into the indicator on a second interface having bar-type in case of setting the passage destination. At this time, the indicators on the interface having bar-type may be aligned in distance and temporally, one end of the first interface is automatically set as the joint destinations and the other end of it is automatically set as the locations of the member farthest away from the joint destinations of the group members, and one end of the second interface is automatically set as the passage destination and the other end of it is automatically set as the location of the member, that is the farthest from the passage destination, of the members sharing the passage destination.

The controller 180 displays the location information of the group members on the map and simultaneously on the interface having the bar-type during the limiting time, and may end the providing of the location information for the group members on ending the limiting time. When the providing of the location information for the group members ends, the group information including information of the group members and the names of the groups may be stored. That is, the controller 180 may continually maintain the produced groups even after the limiting time is lapsed.

Hereinafter, a detailed method for producing the groups from the electronic device 100 will be described with reference to the drawings.

FIG. 4 to FIG. 9 explain group production for providing the location information service of the electronic device related to one embodiment of the present invention.

Figure 4:
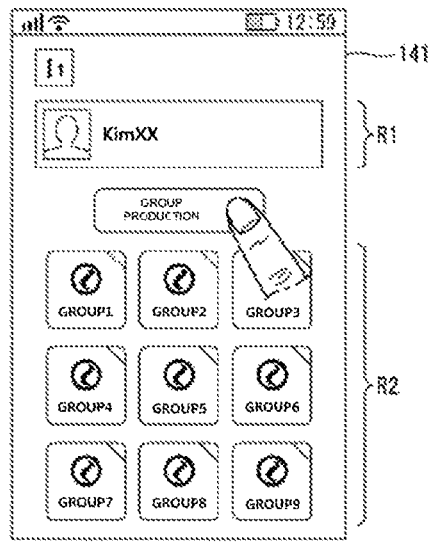
FIG. 4 to FIG. 9 explain group production for providing location information services of the electronic device related to one embodiment of the present invention.

Referring to FIG. 4, the controller 180 displays user information logged into the location information services as the accounts of the social network services on a first region (R1) of a display module 141, and displays use histories of the location information services on a second region (R2).

The controller 180 may display the widget having types set to defaults on main screen of the screen executing the location information services when the user initially uses the location information services. The location information services manages histories based on the user's accounts, and therefore the previous use histories may be checked at different electronic device in case of using the location information services at many electronic device by the same user and accounts. The user touches group production icons to produce new groups that will use the location information services.

The controller 180 may display the address list information received from the location information service providing server 400 into friend lists on requesting the group production.

Figure 5:
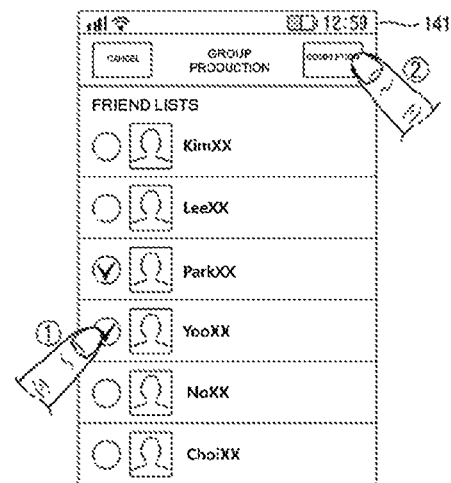

Referring to FIG. 5, when the user selects at least one of the friend lists (①) and touches a completion icon (②), the controller 180 may set at least one friend selected by the user to the group member. The controller 180 may determine the production of the groups when the group members are set.

For example, when the user, that is, 'KimXX' selects 'ParkXX' and 'YuXX' and touches the completion icon, the controller 180 may set 'Kim=', 'ParkXX' and 'YuXX', including the user oneself, as the members of group 1.

Figure 6:
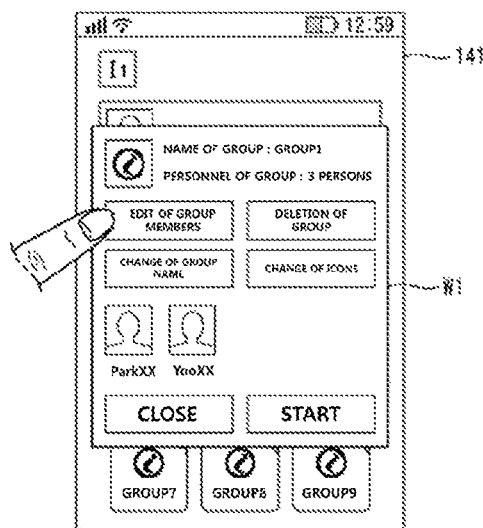

Referring to FIG. 6, the controller 180 may provide a pop-up window W1 for displaying the brief information and edit menus of the produced groups on producing the groups. The edit menus displayed on the pop-up window W1 change the members of the groups, the name of the groups and the group icons, or may provide the functions for deleting the produced groups.

For example, the controller 180 may display the brief information including 'the name of the group: group 1', 'the personnel of the group: three persons' and the name of the group members or on-line ID, and the edit menu icons including 'edit of the group members', 'deletion of the group', 'change of the group name' and 'change of the icons' on the pop-up window W1 in case of setting three person such as 'Kim=', 'ParkXX' and 'YuXX' to the group members and of producing it as 'group1'.

The user may edit the members, name and icons, etc. of the groups produced using the edit menus while checking the brief information of 'group 1' displayed on the pop-up window W1.

The controller 180 may display edit screen of the groups capable of adding or deleting the members of the groups on the display module 141 in case of selecting an edit icon of the group members of the pop-up window W1.

Figure 7:
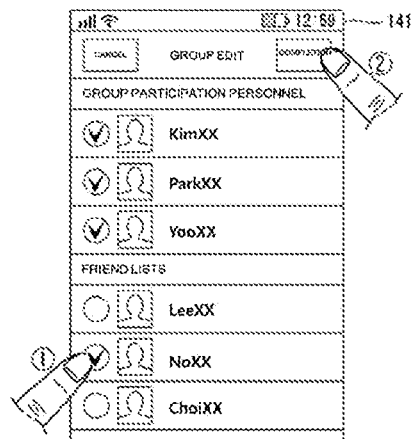

Referring to FIG. 7, the controller 180 may display the edit screen of the group capable of adding or deleting the members of the groups on the display module 141. The controller 180 deletes specific members from the members of the groups on inputting deselection of the specific members of 'group participation' lists, and adds specific friends to the members of the groups on inputting selection of the specific friends of 'friend lists'.

For example, the controller 180 adds 'NoXX' to the members of the groups on inputting the selection of 'NoXX' of 'friend lists' displayed on the edit screen of the groups.

On the other hand, the controller 180 may display changing screen of the group name on the display module 141 on inputting the selection of 'change of the group name' of the edit menus displayed on the pop-up window W1 shown in FIG. 6.

Figure 8:
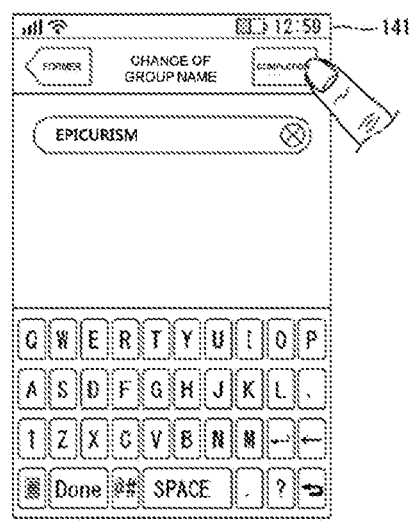

① Referring to FIG. 8, the controller 180 may divide and display the changing screen of the group name into a first region for checking the group name and a second region (for example, a key pad region) for inputting the group name. The user directly inputs the group name to be changed using the keypad, and may change the group name by touching the completion icon.

On the other hand, the controller 180 may display the changing screen of the icon on the display module 141 on inputting the selection of 'change of the icon' of the edit menus displayed on the pop-up window W1 shown in FIG. 6.

Figure 9:
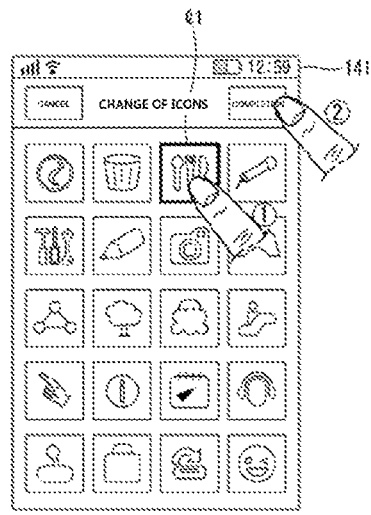

Referring to FIG. 9, the controller 180 displays pre-stored plurality of icons on the changing screen of the icon, and may display edges of the specific icon into highlight 11 on receiving inputs for the specific icon (①).

The controller 180 may change and set the icons of the groups to the specific icon on receiving the inputs for the specific icon (①) and on receiving the inputs for the completion icon (②).

It is possible to edit the group information by the above-described methods.

Hereinafter, a detailed method for setting addition information of the groups in the electronic device 100 will be described with reference to the drawings.

Figure 10:
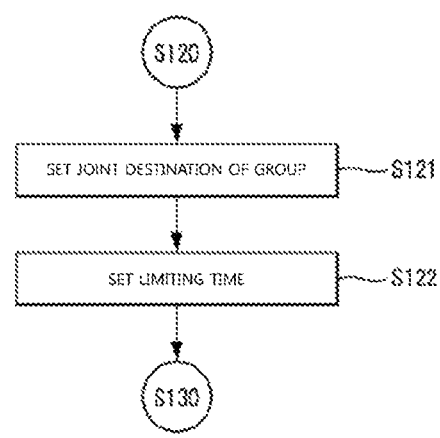
FIG. 10 is a flow chart setting additional information to groups for providing the location information services of the electronic device related to one embodiment of the present invention.

FIG. 10 is a flow chart setting additional information to groups for providing the location information service of the electronic device related to one embodiment of the present invention, and FIG. 11 to FIG. 17 explain additional information setting for groups for providing the location information service of the electronic device related to one embodiment of the present invention.

Referring to FIG. 10, on completing the group production, the controller 180 may set the joint destination of the groups (S121) and may set the limiting time providing the location information services (S122).

Figure 11:
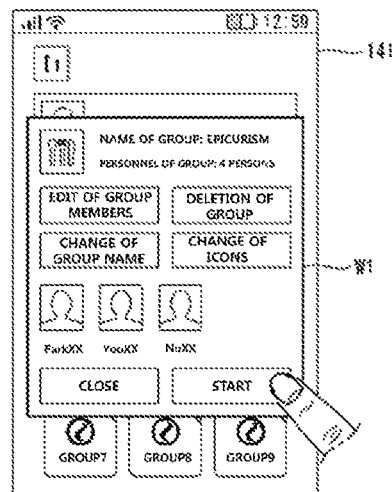
FIG. 11 to FIG. 17 explain additional information setting for groups for providing the location information services of the electronic device related to one embodiment of the present invention.

Referring to FIG. 11, on receiving the input for a 'start' icon of the pop-up window W1 shown in FIG. 6, the controller 180 determines the completion of the group production and may perform a step for setting the joint destination of the group and the limiting time.

Figure 12:
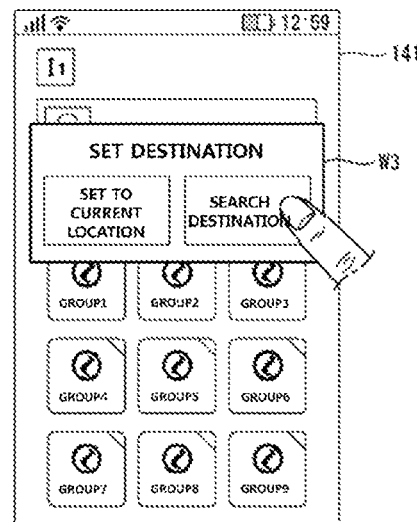

Referring to FIG. 12, when the input for a 'start' icon of the pop-up window W1 is received, the controller 180 may provide the pop-up window W3 marking contents for destination setting.

That is, the controller 180 may display 'set to current location' or 'search destination' icon on the pop-up window W3, and the user selects the icon displayed on the pop-up window W3 to select whether the joint destination of the produced group is set as the current location of the user or the destination to be searched.

The controller 180 may display the screen capable of directly inputting the destination on receiving the input for a 'search destination' icon. The controller 180 divides and displays the first region for checking the inputted destination, and the second region including the key pad capable of inputting the destination. It is possible to display a candidate destination when the destination is inputted by the second region and the destination search is requested.

Figure 13:
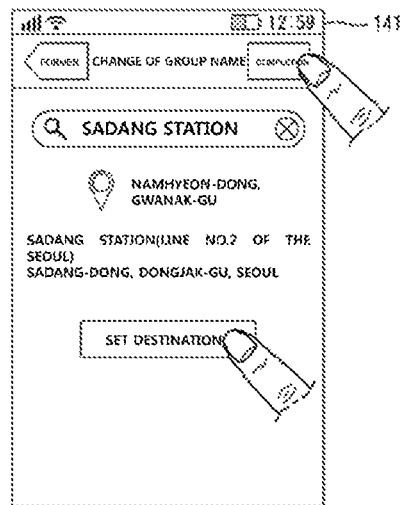

Referring to FIG. 13, the controller 180 may display the candidate destination for the inputted destination, and may display the icon for receiving the input setting each candidate destination as the joint destination.

The controller 180 may set the selected destination to the joint destination of the groups in case of receiving the input for setting any one of the candidate destination to the destination.

Figure 14:
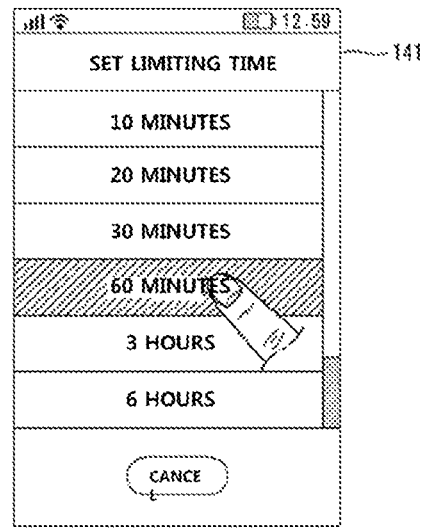

Referring to FIG. 14, the controller 180 may provide the screen for setting the limiting time when the destination setting of the groups is completed. The limiting time may be displayed as predetermined time unit such as 10 minutes, 20 minutes, 30 minutes, 60 minutes, 3 hours, 6 hours, etc., and the setting of the limiting hour moves scrolls and may be set by the input for the time you need.

For example, the controller 180 may set the limiting time of the groups to 60 minutes in case of receiving the input for the limiting time '60 minutes'.

Figure 15:
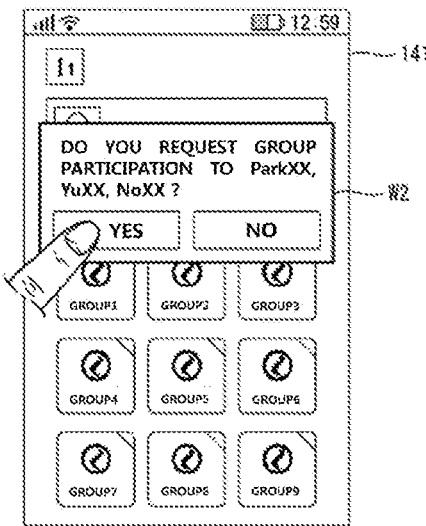

Referring to FIG. 15, when each of the joint destination and limiting time setting are completed, the controller 180 may display a pop-up window W2 for selecting whether messages requesting the group participation are transmitted to the group members.

For example, when another electronic device's user, that is, 'ParkXX', 'YuXX' and 'NoXX' except the electronic device's user, that is, 'KimXX' are set, the controller 180 may display the pop-up window W2 for selecting whether the messages requesting the group participation are transmitted to another electronic device's user, that is, 'ParkXX', 'YuXX' and 'NoXX', and may transmit group participation request messages to the electronic device of each user when message transmission is selected (for example, input receipt for the icon).

The controller 180 may transmit the group participation request messages through the social network service server 300. Therefore, when the applications for the location information services are not disposed in the electronic device of the user receiving the group participation request messages, disposal of the applications for the location information services may be derived and it is possible to transmit the messages using the applications for activated social network services.

For example, when the location information service servers are interworked with Kakao Talk social network service servers, the location information service servers may transmit the group participation request messages to the members of the groups, that is, 'ParkXX', 'YuXX' and 'NoXX' through the Kakao Talk social network service servers.

Figure 16:
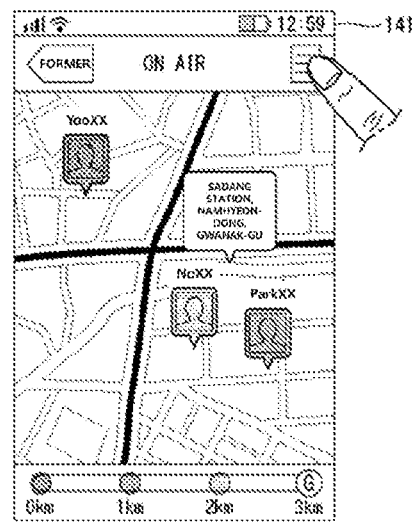

Referring to FIG. 16, the controller 180 periodically receives the location information from the members accepting the group participation and displays them on the map and may display the location information of the members accepting the group participation into the indicator on the interface having bar-type.

That is, when 'ParkXX' and 'YuXX' only of 'ParkXX', 'YuXX' and 'NoXX' receiving the group participation request messages accepts the group participation, the location information only of the users, that is, 'KimXX', 'ParkXX' and 'YuXX' may be displayed.

Further, the controller 180 may display detail information for the group and the members included in the group on receiving the specific input (in case of receiving the input for the specific icon).

Figure 17:
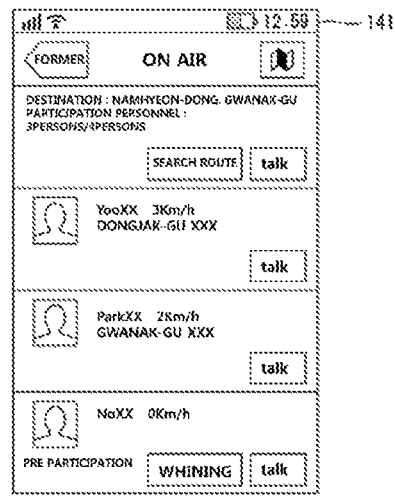

Referring to FIG. 17, on receiving the input from the user, the controller 180 may display the detail information for the joint destination of the groups and the detail information including current location information, average speed per hour, whether or not to participate into the group, etc. for each member of the groups.

For example, the controller 180 may display 'preparticipation' as the detail information for 'No XX' that receives the group participation request and does not accept the group participation, and may display a 'whining' icon for transmitting the messages requesting the group participation again. At this time, when the input for the 'whining' icon is received, the controller 180 may transmit the group participation request messages to 'No XX' through the social network service providing server 300. Further, the controller 180 may provide information for the current location and average speed per hour to 'YuXX' and 'ParkXX' accepting the group participation.

Hereinafter, a detailed method for setting the passage destination of the groups in the electronic device 100 will be described with reference to the drawings.

Figure 18:
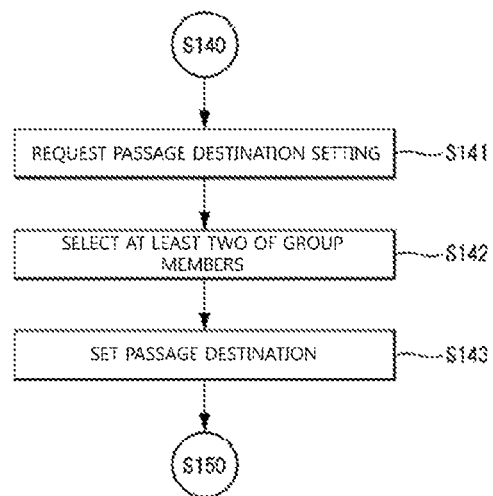
FIG. 18 is a flow chart setting a passage destination to groups for providing the location information services of the electronic device related to one embodiment of the present invention.

FIG. 18 is a flow chart setting the passage destination of the groups for providing the location information service of the electronic device related to one embodiment of the present invention, and FIG. 19 to FIG. 24 explain the passage destination setting of the groups for providing the location information service of the electronic device related to one embodiment of the present invention.

Referring to FIG. 18, the controller 180 may perform the passage destination setting for some of the members of the groups after transmitting the group participation request messages to the members of the groups.

The passage destination setting for all members of the groups is not needed, at least two of the members of the groups are selected and set, and a plurality of passage destination may be set.

On receiving the passage destination setting request (S141), the controller 180 selects at least two of the group members (S142), and may set the passage destination (S143).

Figure 19:
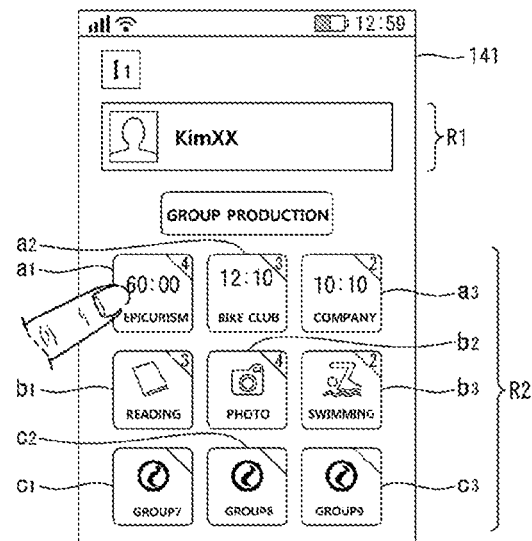
FIG. 19 to FIG. 24 explain the setting of the passage destination into the groups for providing the location information services of the electronic device related to one embodiment of the present invention.

Referring to FIG. 19, in case of receiving the input of the group widget displayed on the main screen of the applications for the location information services, the controller 180 determines it as destination setting request signals.

The controller 180 divides and displays the display module 141 into the first region (R1) for displaying the user information, and the second region (R2) for displaying the group widget. The second region (R2) is displayed with the group widget, and the group widget includes group widgets (a1 to a3) being currently applied with the limiting time, group widgets (b1 to b3) ended with the limiting time, and group widgets (c1 to c3) that are not produced. The group widgets (a1 to a3) being currently applied with the limiting time may display change of the limiting time on the widgets in real time. For example, the controller 180 may display the remaining limiting time of an epicurism group: 60 minutes 00 seconds, the remaining limiting time of a bike club group: 12 minutes 10 seconds and the remaining limiting time of a company group: 10 minutes 10 seconds on the group widgets. Further, the controller 180 may display the name, icon and member personnel of the produced group widgets on each widget. In the embodiment of the present invention, the location information of the users, included in each group, received until the lapse of the limiting time is efficiently updated, and the limiting time may be extended.

Further, the controller 180 may display a switch icon I1 connecting to the applications for searching the route on the top of the display module 141, and may perform a switch between the main screen of the applications for the location information services of the groups and the main screen of the route search applications on receiving the input for the switch icon I1.

Figure 20:
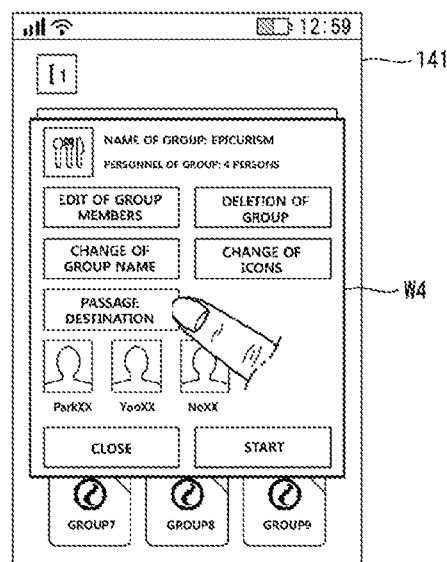

Referring to FIG. 20, on receiving the input for the group widgets, the controller 180 may display the pop-up window W4 for providing the group detail information and edit menus for the selected group widgets. At this time, the pop-up window W4 displays the pop-up window (W1 shown in FIG. 6) provided for editing after the group production and the edited group information, and is different in that the icon for setting the passage destination is added.

On receiving the input for the icon for setting the passage destination of the pop-up window (W4), the controller 180 may enter into a step for setting the selection of the group members and passage destination.

Figure 21:
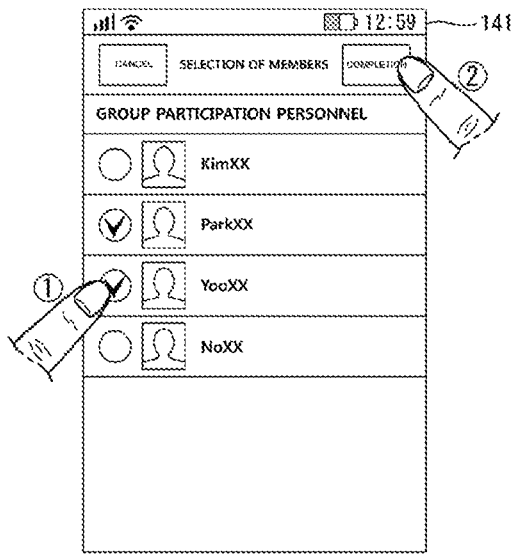

Referring to FIG. 21, the controller 180 may display the screen for selecting some of the group members. In more detail, the controller 180 may provide the lists of the members included in the groups, and the items for displaying the selected input corresponding to them.

On receiving the selected input for 'ParkXX' and 'YuXX' of the members included in the groups and the input for the completion icon, the controller 180 may display the screen for setting the passage destination. It is possible to divide and display the screen for setting the passage destination into a first region for checking the inputted passage destination and a second region including the key pad for inputting the passage destination.

Figure 22:
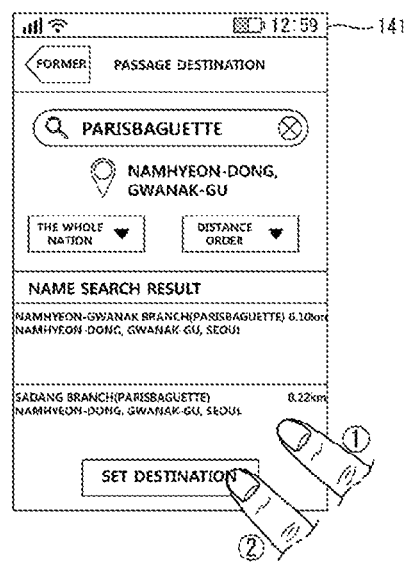

Referring to FIG. 22, the controller 180 may display a candidate passage destination and a destination setting icon on requesting the search for the inputted passage destination.

The controller 180 may set a specific passage destination to a final passage destination in case of selecting (①) the specific passage destination of the candidate passage destination and receiving (②) the input for setting the selected specific passage destination to the destination.

Figure 23:
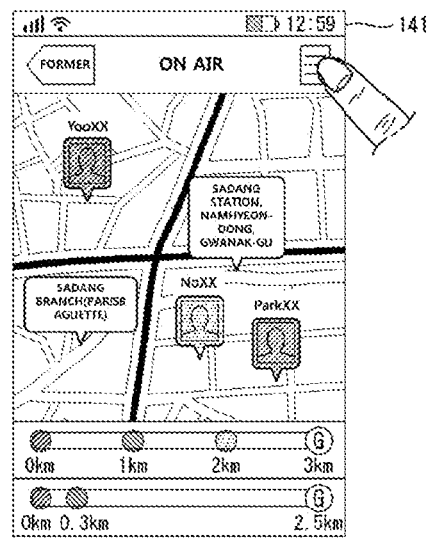

Referring to FIG. 23, the controller 180 displays a first interface, having the bar-type, representing the location information of the group members for the joint destination of the groups together with a second interface, having the bar-type, representing the location information of the members sharing the passage destination for the passage destination as the bar-type, in case of setting the passage destination.

The controller 180 may display a color of the indicator on the first and second interfaces as the same color as it representing the location information of the members displayed on the map.

The controller 180 sets one side of the first interface to the joint destination and sets the other side as the staring location of members, having farthest distance, of the group members. Similarly, the controller 180 sets one side of the second interface to the passage destination and sets the other side as the staring location of members, having farthest distance, of the members sharing the passage destination. The controller 180 may display the unit of the interface having the bar-type as distance unit or remaining moving time unit.

The location displayed by the indicator on each interface is changed according to the change of the location information of the members, the indicator only representing the members next to the destination is displayed in case of arriving at the joint destination or passage destination and the display for distance or time may not be performed.

Figure 24:
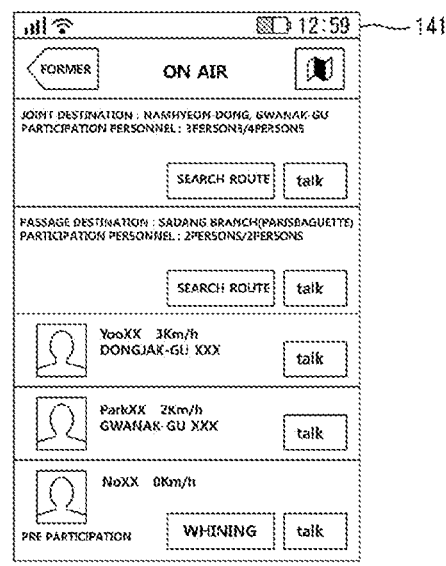

Referring to FIG. 24, on receiving the specific input, the controller 180 may display the detail information for the joint destination and passage destination of the groups and the detail information including current location information, average speed per hour, whether or not to participate into the groups, etc. for each member of the groups.

For example, the controller 180 may display 'preparticipation' as the detail information for 'No XX' that receives the group participation request and does not accept the group participation, and may display a 'whining' icon for transmitting the messages requesting the group participation again.

Further, the controller 180 may display information for the current location and average speed per hour to 'YuXX' and 'ParkXX' accepting the group participation on the display module 141.

As above, the location information service providing server of the present invention transmits the messages (group participation messages or chatting messages) through the social network service providing server by interworking with the social network service providing server, may intuitively provide the location information of the group members while using the existing built social network service by configurations for managing the group production and group history information through the location information service providing server, and may enhance user's convenience by continuously managing the produced group history.

A method for controlling the electronic device and a method for providing the location information service in the present invention described above are recorded into a computer-readable recording medium by programs for executing in a computer.

A method for controlling the electronic device and a method for providing the location information service in the present invention may be executed by softwares. The configurations of the present invention executed by the softwares are code segments executing necessary works. Programs or code segments are stored into a processor-readable medium or may be transmitted by computer data signals coupled with carriers at a transmission medium or communication network.

The computer-readable recording medium includes the entire type of recoding devices storing readable data by a computer system. Examples of the computer-readable recording devices are ROM, RAM, CD-ROM, DVD±ROM, DVD-RAM, magnetic tape, floppy disk, hard disk, photo data storage device, etc. The computer-readable recording medium is distributed to the computer system connected to network, and the computer-readable code is stored in a distributed way and may be performed.

According to an embodiment of the present invention, the social network service servers may produce the group provided with the location information and may transmit the group participation request messages.

According to another embodiment of the present invention, detailed location information of the group members and the location relationship for another member may be intuitively checked.

According to further another embodiment of the present invention, it is possible to acquire detail location information including current locations, moving velocity, etc. of the group members, thereby to predict arrival time of the group members.

It will be apparent to those skilled in the art that the foregoing present invention is not limited by the foregoing embodiments and the accompanying drawings but by the claims, and various modifications and changes may be made without departing from the scope and spirit of the invention.

What is claimed is:

1. A non-transitory computer readable storage medium storing an application for a navigation service, the application comprising instructions which, when executed by a first electronic device with at least one communication circuitry and at least one display, cause the first electronic device to:
  while executing the application, display, via the at least one display, a list including a plurality of visual objects respectively indicating a plurality of electronic devices within a user interface (UI) of the application, the plurality of electronic devices comprising a second electronic device;
  while displaying the list within the UI, receive, via the at least one display, a user input for selecting a visual object indicating the second electronic device from among the plurality of visual objects;
  based on receiving the user input, transmit, via the at least one communication circuitry, information regarding a changed location of the first electronic device moving along a route to a destination of a user of the first electronic device to the second electronic device, wherein the route to the destination has been obtained in the first electronic device interworking with a server, and wherein the changed location of the first electronic device is obtained via the at least one communication circuitry; and
  while transmitting the information regarding the changed location of the first electronic device, display, via the at least one display, a bar-shaped visual representation for indicating a relative positional relationship between the first electronic device being moved to the destination and the second electronic device being moved to the destination, wherein the bar-shaped visual representation is displayed while displaying an electronic map within the UI.

2. The non-transitory computer readable storage medium of claim 1, wherein the application comprises instructions which, when executed by the first electronic device, cause the first electronic device to:
  display, via the at least one display, a first visual representation for indicating a location of the first electronic device being moved to the destination and a second visual representation for indicating a location of the second electronic device being moved to the destination, and
  wherein the first and second visual representations are associated with the bar-shaped visual representation to indicate the relative positional relationship.

3. The non-transitory computer readable storage medium of claim 2, wherein the application comprises instructions which, when executed by the first electronic device, further cause the first electronic device to:
  change, via the at least one display, a display position of the first visual representation associated with the bar-shaped visual representation based on a distance between the location of the first electronic device and the destination; and
  change, via the at least one display, a display position of the second visual representation associated with the bar-shaped visual representation based on a distance between the location of the second electronic device and the destination.

4. The non-transitory computer readable storage medium of claim 2, wherein the application comprises instructions which, when executed by the first electronic device, further cause the first electronic device to:
  change, via the at least one display, a display position of the first visual representation associated with the bar-shaped visual representation based on estimated time of arrival of the first electronic device to the destination; and
  change, via the at least one display, a display position of the second visual representation associated with the bar-shaped visual representation based on estimated time of arrival of the second electronic device to the destination.

5. The non-transitory computer readable storage medium of claim 4, wherein the estimated time of arrival of the first electronic device to the destination and the estimated time of arrival of the second electronic device to the destination are displayed while displaying the bar-shaped visual representation.

6. The non-transitory computer readable storage medium of claim 2, wherein the application comprises instructions which, when executed by the first electronic device, further cause the first electronic device to:
  display, via the at least one display, a third visual representation for indicating the location of the first electronic device being moved to the destination and a fourth visual representation for indicating the location of the second electronic device being moved to the destination in the electronic map within the UI,
  wherein the third visual representation is distinct from the first visual representation, and
  wherein the fourth visual representation is distinct from the second visual representation.

7. The non-transitory computer readable storage medium of claim 1, wherein each of the plurality of visual objects includes at least one of:
  identification information of a user associated with each of the plurality of electronic devices;
  brief information of the user associated with each of the plurality of electronic devices; or
  profile information of the user associated with each of the plurality of electronic devices.

8. The non-transitory computer readable storage medium of claim 1, wherein the selected visual object is highlighted relative to remaining visual objects.

9. The non-transitory computer readable storage medium of claim 8, wherein the selected visual object is highlighted by a difference of a representation of an edge portion of the list.

10. The non-transitory computer readable storage medium of claim 1, wherein the application comprises instructions which, when executed by the first electronic device, further cause the first electronic device to:
while displaying the bar-shaped visual representation, display, via the at least one display, with the bar-shaped visual representation, a visual affordance for guiding the route to the destination, and
wherein the visual affordance is superimposed on the electronic map within the UI.

11. A non-transitory computer readable storage medium storing an application for a navigation service, the application comprising instructions which, when executed by a first electronic device with at least one communication circuitry and at least one display, cause the first electronic device to:
while executing the application, receive, via the at least one communication circuitry, information regarding a changed location of the second electronic device moving along a route to a destination of a user of the second electronic device, wherein the route of the destination has been obtained in the second electronic device interworking with a server, and wherein the changed location of the second electronic device is obtained via at least one communication circuitry of the second electronic device; and
based on receiving the information, display, via the at least one display, a bar-shaped visual representation for indicating a relative positional relationship between the first electronic device being moved to the destination and the second electronic device being moved to the destination, wherein the bar-shaped visual representation is displayed while displaying an electronic map within the UI.

12. The non-transitory computer readable storage medium of claim 11, wherein the application comprises instructions which, when executed by the first electronic device, cause the first electronic device to:
display, via the at least one display, a first visual representation for indicating a location of the first electronic device being moved to the destination and a second visual representation for indicating a location of the second electronic device being moved to the destination, and
wherein the first and second visual representations are associated with the bar-shaped visual representation to indicate the relative positional relationship.

13. The non-transitory computer readable storage medium of claim 12, wherein the application comprises instructions which, when executed by the first electronic device, further cause the first electronic device to:
change, via the at least one display, a display position of the first visual representation associated with the bar-shaped visual representation based on a distance between the location of the first electronic device and the destination; and
change, via the at least one display, a display position of the second visual representation associated with the bar-shaped visual representation based on a distance between the location of the second electronic device and the destination.

14. The non-transitory computer readable storage medium of claim 12, wherein the application comprises instructions which, when executed by the first electronic device, further cause the first electronic device to:
change, via the at least one display, a display position of the first visual representation associated with the bar-shaped visual representation based on estimated time of arrival of the first electronic device to the destination; and
change, via the at least one display, a display position of the second visual representation associated with the bar-shaped visual representation based on estimated time of arrival of the second electronic device to the destination.

15. The non-transitory computer readable storage medium of claim 14, wherein the estimated time of arrival of the first electronic device to the destination and the estimated time of arrival of the second electronic device to the destination are displayed while displaying the bar-shaped visual representation.

16. The non-transitory computer readable storage medium of claim 12, wherein the application comprises instructions which, when executed by the first electronic device, further cause the first electronic device to:
display, via the at least one display, a third visual representation for indicating the location of the first electronic device being moved to the destination and a fourth visual representation for indicating the location of the second electronic device being moved to the destination in the electronic map within the UI,
wherein the third visual representation is distinct from the first visual representation, and
wherein the fourth visual representation is distinct from the second visual representation.

17. The non-transitory computer readable storage medium of claim 12, wherein the second visual representation includes a profile image of the user.

18. The non-transitory computer readable storage medium of claim 11, wherein the application comprises instructions which, when executed by the first electronic device, further cause the first electronic device to:
display, via the at least one display, a visual object for inquiring whether or not to obtain the information regarding the changed location of the second electronic device; and
based on receiving a user input on the visual object, receive, via the at least one communication circuitry, the information regarding the changed location of the second electronic device.

19. The non-transitory computer readable storage medium of claim 12, wherein the application comprises instructions which, when executed by the first electronic device, further cause the first electronic device to:
display, via the at least one display, information regarding average speed of the second electronic device being moved along the route.

20. The non-transitory computer readable storage medium of claim 11, wherein the UI further includes an executable object for sending a text message to the user of the second electronic device through the application.

* * * * *